United States Patent

[11] 3,547,021

| [72] | Inventor | Wilhelm Pross<br>Munich, Germany |
| [21] | Appl. No. | 734,627 |
| [22] | Filed | June 5, 1968 |
| [45] | Patented | Dec. 15, 1970 |
| [73] | Assignee | Compur-Werk Gesellshaft mit<br>beschrankter Haftung & Co.,<br>Munich, Germany<br>a firm of Germany |
| [32] | Priority | June 28, 1967 |
| [33] | | Germany |
| [31] | | No. C42726 |

[54] PHOTOGRAPHIC CAMERA HAVING PULSE CONTROLLED SHUTTER
4 Claims, 2 Drawing Figs.

[52] U.S. Cl. .................................................. 95/53
[51] Int. Cl. .................................................. G03b 9/00,
G03b 9/58
[50] Field of Search ........................................ 95/53, 36, 58

[56] References Cited
UNITED STATES PATENTS

| 3,020,816 | 2/1962 | Frenk ...................... | 95/58 |
| 3,348,462 | 10/1967 | Fahlenberg ............... | 95/53 |
| 3,386,364 | 6/1968 | Hayden .................... | 95/53 |
| 3,448,671 | 6/1969 | Rentschler ................ | 95/53 |

FOREIGN PATENTS

| 1,106,310 | 11/1966 | Great Britain ............ | 95/53 |

*Primary Examiner*—John M. Horan
*Assistant Examiner*—Robert P. Greiner
*Attorney*—Larson, Taylor & Hinds ABSTRACT: A photographic camera arrangement of the type in which a control unit controls the operation of a shutter unit by actuating (opening) and deactuating (closing) pulses, a variation in the interval between the pulses producing a variation in the exposure time provided by the shutter, includes means built into the shutter for adapting the interval between pulses to the physical characteristics of the shutter mechanism. The means built into the shutter unit may comprise a resistor which is automatically connected into a RC timing network in the control unit upon connection of the control unit to the particular shutter unit.

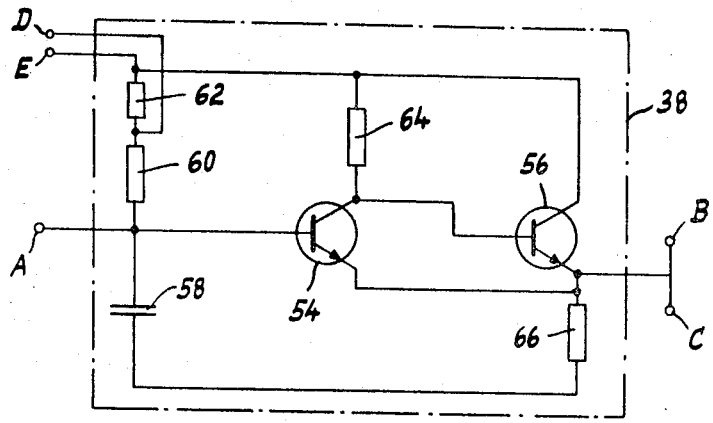
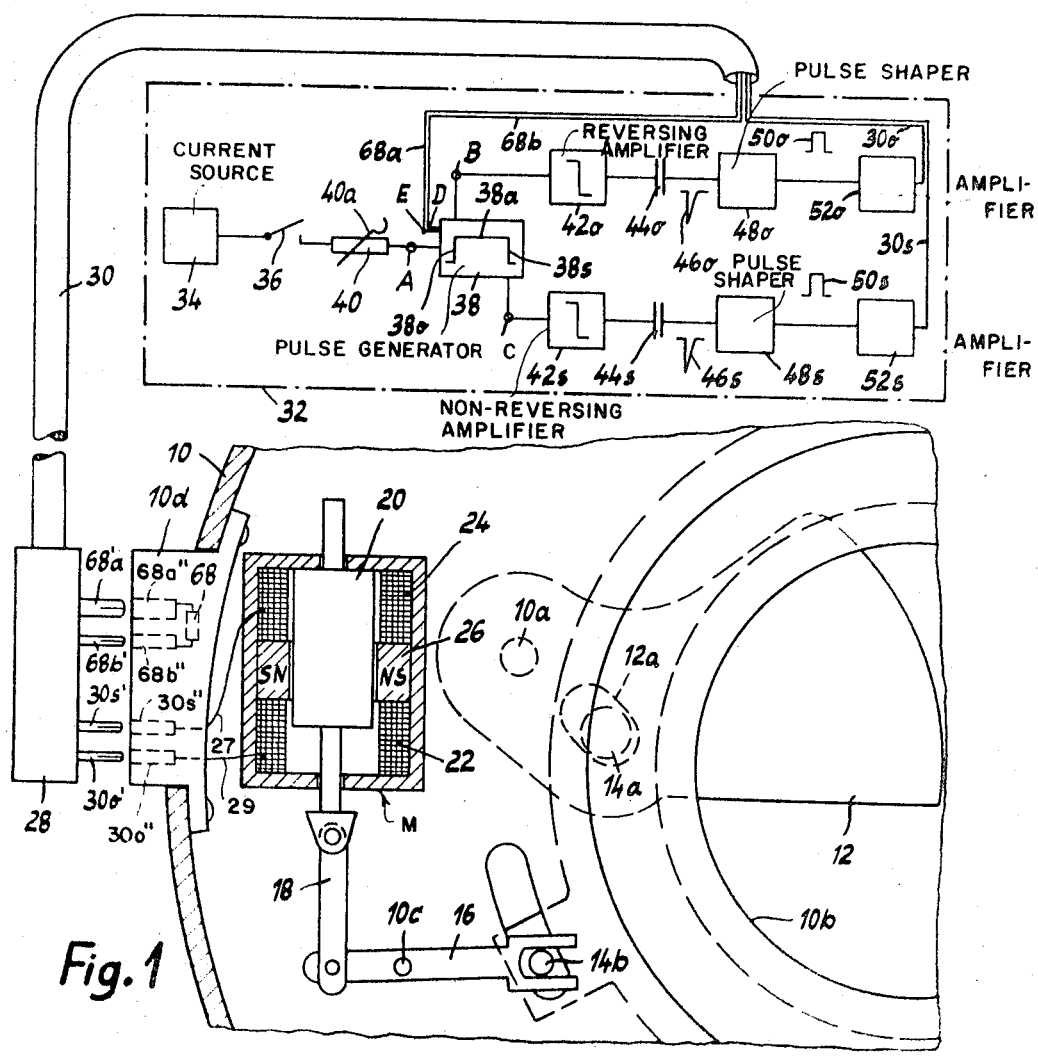

3,547,021

PHOTOGRAPHIC CAMERA HAVING PULSE CONTROLLED SHUTTER

BACKGROUND OF THE INVENTION

1. Field of the Invention

The present invention relates to photographic cameras and more particularly to electrical means for controlling the effective exposure provided by such cameras.

2. Description of the Prior Art

In accordance with a conventional form of photographic camera the shutter ring of a common shutter arrangement is controlled through movement of the armature of an electronically operated magnetic control device. In cameras of this type first and second timing pulses respectively control the opening movement and the closing movement of the shutter, the time interval between the pulses determining the exposure time provided by the shutter arrangement. The duration of the exposure time may be varied by varying the interval between these pulses. These timing pulses are generated and controlled by an electronic device which may be made detachable from the camera shutter arrangement and thus may be used with different cameras having different shutter arrangements of this type or even with different interchangeable shutter arrangements used with the same camera.

SUMMARY OF THE INVENTION

In accordance with the present invention the electronic control device for the exposure timing pulses is adapted to the particular characteristics of the shutter mechanism with which the electronic device is used. It will be appreciated that different shutter mechanisms, because of differences in the physical constructions thereof, will, in general, provide exposure times of different duration. For example, larger and more bulky shutter mechanisms, because of the higher inertia occasioned by the greater mass thereof, will in general respond more slowly to actuating signals and thus the slopes of the rising and falling portions of the generally trapezoidal response curve for such mechanisms will be comparatively greater than the corresponding slopes of relatively faster acting shutter mechanisms. This increase in slope results in a decrease in length of the flat portion of the response curve and thus in a decrease in the effective exposure time provided by the shutter mechanism for given actuating and deactuating signals. According to the present invention means associated with the electronic control device are provided for automatically controlling the time interval between the timing pulses in accordance with the characteristics of the particular shutter mechanism with which the electronic device is used. In this way, among other advantages, a generally uniform effective exposure time period is provided and thus a standard exposure time scale may be used with the electronic device.

In accordance with a presently preferred embodiment of the invention the control means are incorporated into a camera arrangement of the type wherein the electronic device basically comprises a Schmitt trigger circuit and an associated RC timing network. The electronic device is detachable from the shutter arrangement to provide remote control thereof and is connected thereto through a flexible electrical cable. In accordance with this preferred embodiment, connection of the electronic device to the shutter arrangement automatically connects a circuit element such as a resistor into circuit relationship with the RC timing control network for the Schmitt trigger and thus the time interval between timing pulses and ultimately the response of the shutter arrangement is automatically accommodated to the particular physical characteristics of the shutter mechanism.

Other features and advantages of the present invention not specifically enumerated here will be set forth in or apparent from the detailed description of a preferred embodiment of the invention found hereinbelow.

BRIEF DESCRIPTION OF THE DRAWINGS

FIG. 1 is a representation of a presently preferred embodiment of the invention including a circuit diagram of the electronic control device therefor; and FIG. 2 is a schematic diagram of a portion of the circuit of FIG. 1.

DESCRIPTION OF THE PREFERRED EMBODIMENT

Referring to FIG. 1, a portion of a photographic camera includes a number of shutter blades mounted within a shutter housing generally denoted 10 (only one shutter blade 12 actually being shown in FIG. 1 for purposes of clarity). Shutter blade 12 is pivotally mounted by a pivot pin 10a and includes a control slot 12a therein which is adapted to receive a control pin 14a mounted on a shutter drive ring 14. Drive ring 14 is mounted for rotation about the objective aperture 10b of the shutter housing 10 and includes a drive pin 14b mounted on an outwardly extending portion thereof. Pin 14b is received in a slot in one end of a double-armed drive lever 16 which pivots about a pivot pin 10c. The other end of lever 16 is pivotally secured to a linkage 18 which is connected through suitable means to the armature 20 of an electromatic control device generally denoted M.

Control device M includes first and second magnetic windings 22 and 24 which are separated from one another by an intermediate permanent magnet 26 of generally annular construction. Permanent magnet 26 amplifies the effectiveness of magnetic windings 22, 24 and acts to maintain armature 20 in the end position thereof as is described hereinbelow. Reference is made to commonly assigned copending application Ser. No. 594,167 filed Nov. 14, 1966 now U.S. Pat. No. 3,466,993, for further details of the operation of the electromagnetic control device.

Magnetic control device M is mounted within the shutter housing as shown and is connected through first and second conductors 27 and 29 to a contact socket 10d which extends outwardly of shutter housing 10. Contact socket 10d includes first and second socket recesses 30s'' and 30o'' adapted to receive contact pins 30s' and 30o' of a contact plug 28. Socket 10d further includes socket recesses 68a'' and 68b'' adapted to receive contact pins 68a' and 68b' of contact plug 28, the function of the connection formed thereby being described hereinbelow. A cable 30 connects contact plug 28 with an electronic control device generally denoted 32 which provides control timing pulses for actuating electromagnetic control device M.

Included within the housing for the control device 32 is a current source 34 which conveniently may be a battery. A switch 36, in the closed position thereof, connects source 34 with a control pulse generator 38 which produces rectangular electrical control pulses as indicated by pulse 38a. A variable resistor 40 included in the series connection between the current source 34 and pulse generator 38 provides means for varying the duration of the control pulse 38a produced by pulse generator 38. A manual control member 40a for varying the value of resistor 40 includes an end portion which cooperates with a scale (not shown) fixedly mounted in or on the housing for the control device 32 to provide an indication of the exposure time corresponding to the particular setting of member 40a. The value of resistance 40 will determine the width of pulse 38a and thus, in a manner more fully explained hereinbelow, the effective exposure time provided by the shutter mechanism.

The output of pulse generator 38 is fed through a reversing amplifier 42o and a differentiating capacitor 44o to a pulse shaper 48o and the leading edge 38o of control pulse 38a is converted by amplifier 42o and capacitor 44o into a negative needle pulse or spike 46o. Negative spike 46o is converted by pulse shaper 48o into a rectangular pulse of a predetermined duration. The pulse so produced is represented in FIG. 1 at 50o. Pulse 50o is amplified in power amplifier 52o and the resultant pulse is transmitted through a conductor 30o within cable 30 through the connection between contact plug 28 and socket 10d and conductor 27 to magnetic winding 22.

In a similar manner the trailing edge 38s of control pulse 38a is converted by a nonreversing amplifier 42s and a differentiating capacitor 44s into a negative spike 46s. Spike 46s is similarly converted by a pulse shaper 48s into a rectangular pulse 50s which is amplified by a power amplifier 52s and passes through conductor 30s, contact plug 28, contact socket 10d and conductor 29 to magnetic winding 24.

Amplifiers 42o and 42s, pulse shapers 48o and 48s and power amplifiers 52o and 52s are conventional and any suitable devices for performing the noted functions may be utilized in control device 32. Thus further discussion of the details of construction of these elements is deemed unnecessary.

The control pulse generator 38 is preferably of the design shown in FIG. 2, the circuit shown being basically a Schmitt trigger having an associated RC timing network. FIGS. 1 and 2 may be related by noting the positions of terminals A, B, C and D in FIG. 1. Thus referring to FIG. 2, terminal A designates the input terminal of pulse generator 38 which would be connected to resistance 40 of FIG. 1 while output terminals B and C would be connected to amplifiers 42o and 42s, respectively. Pulse generator 38 generally comprises first and second transistors 54 and 56 and a timing capacitor 58. The emitters of transistors 54 and 56 are connected through resistor 66 and timing capacitor 58 to input terminal A. The collector of transistor 54 is connected to the base of transistor 56 and to the collector of transistor 56 through resistor 64. Input terminal A is connected to the junction of capacitor 58, the base of transistor 54, and the series combination of resistors 60 and 62 as shown. The output of terminals B and C of pulse generator 38 are connected to the emitter of transistor 56. Further output terminals D and E described hereinbelow are located on opposite sides of resistor 62.

Regarding the operation of the pulse generator 38, under normal conditions transistor 56 is conducting and transistor 54 is turned off. Closing of switch 36 produces a pulse which passes through the collector-to-emitter circuit of conducting transistor 56 to output B. Capacitor 58 simultaneously begins charging at a rate determined by the time constant dictated by the value of resistance 40. Capacitor 58 continues to charge until the forward bias on transistor 54 is such as to render transistor 54 conductive. With transistor 54 conducting the voltage on the collector thereof drops and this voltage drop is coupled to the base of transistor 56 to turn transistor 56 off. With transistor 56 turned off control pulse 38a is terminated and the trailing edge 38s thereof appears at output terminal C.

As set forth hereinabove the duration of control pulse 38a is dependent upon the charging rate of capacitor 58 which in turn is determined by the value of variable resistor 40. The durations of pulses 50o and 50s are generally constant for any selected length of control pulse 38a thus, although the duration of control pulse 38a may be positively varied by varying the resistance of resistor 40 which in turn varies the time interval between pulses 50o and 50s and thus the exposure time provided by the shutter, the duration of pulses 50o and 50s remains unchanged. Thus as pointed out hereinabove it is necessary when using electronic control device 32 with shutter arrangements of various response characteristics to provide means for automatically adapting the control signals provided by the control device 32 to the physical characteristics of the particular shutter arrangement so that the use of a single exposure time scale with the control equipment is permitted.

Referring again to FIG. 1, in accordance with the present invention, a fixed resistor 68 of predetermined value is installed in each shutter arrangement like shutter arrangement 10 to provide accommodation of the control signals produced by electronic device 32 to the mechanical peculiarities of that shutter mechanism. Resistor 68 is mounted in socket 10d and is connected between socket recesses 68a'' and 68b'' such that when contact plug 28 is received in socket 10d resistor 68 is connected across terminals D and E of pulse generator 38 through conductors 68a and 68b. With this arrangement, fixed resistor 68 is connected in the RC timing circuit of pulse generator 38 and thus provides automatic compensation for variations in the exposure periods provided by shutter arrangements having different physical characteristics. For example, for a relatively slow responding shutter mechanism the value of resistance 68 is chosen such that the time interval between pulses 50o and 50s is increased as compared with a "standard" interval. This increase will balance out the reduction of the effective exposure time caused by the sluggishness of response of the shutter mechanism. It will be noted that variable resistor 40 still provides means for varying the pulse width of pulse 38a, resistor 68 merely providing a fixed variation in that pulse width in accordance with the physical characteristic of the shutter mechanism associated therewith.

As explained above, because different shutter mechanisms have different responses occasioned by variations in system inertia as well as in the dynamic forces provided in such arrangements. These differences result in different slopes of the side portions of the generally trapezoidal-shaped response curves characteristic of such shutter arrangements which in turn result in differences in the length of the flat central portion of the response curve for a given actuating signal. As set forth, this change in the length of the central portion of the response curve corresponds to a change in the effective exposure time provided by the shutter mechanism. Further, variations in the maximum aperture provided by different shutter arrangements will also effect the exposure provided. As set forth hereinabove, these undesirable variations can be eliminated by the incorporation of different valued resistances like resistance 68 into the timing circuit of the pulse generator 38 to adjust the time interval between pulses 50o and 50s such that an effective exposure time of uniform duration is produced for a given setting of control member 40 regardless of the physical characteristics of the shutter mechanism. With this arrangement a single exposure time scale may be utilized with the control equipment 32.

In operation, closing of switch 36 through a conventional release lever (not shown) produces a control pulse 38a of a predetermined length dictated by the setting of variable resistor 40 and the value of resistor 68. As described hereinbefore the leading edge 38o of pulse 38a is ultimately converted into a rectangular pulse 50o which is amplified in amplifier 52o and is transmitted to magnetic winding 22. This pulse produces temporary excitation of winding 22 which causes movement of armature 20 downward from the rest position illustrated in FIG. 1 to an end position. This movement of armature 20 causes opening of shutter blades 12 through cooperating linkage 18 and double-armed lever 16. Armature 20 is held by permanent magnet 26 in the "open" or end position thereof until electronic device 32 provides a deactuating pulse. This deactuating pulse is produced, as set forth above, by converting the trailing edge 38s of control pulse 38a into a rectangular pulse 50s which is amplified in power amplifier 52s and transmitted to magnetic winding 24. Temporary energization of magnetic winding 24 causes attraction of armature 20 upward and movement thereof from the "open" position to the rest position shown in FIG. 1. This movement of armature 20, again through the linkage mechanism including linkage 18 and double-ended lever 16, causes shutter blades 12 to close. Thus the incorporation of a resistor 68 of predetermined value into the timing circuit for pulse generator 38 will, as described hereinbefore, provide variation in the spacing between the opening and closing signal pulses 50o and 50s in accordance with the particular shutter mechanism used and consequently substantially uniform effective exposure.

Although the invention has been described in some detail with reference to a presently preferred embodiment thereof it will be understood that modification therein may be effected without departing from the scope and spirit of the invention. For example, the duration of control impulse 38a may be controlled through a plurality of different valued capacitors which would be connected into circuit relationship with capacitor 58 in a manner similar to that in which resistor 68 is connected. It will be appreciated that a variation in the capacitance of the RC timing circuit for generator 38 will of course have the same effect as varying the resistance thereof. Further, it is noted that the present invention is not limited to incorporation into a pulse generator of the type including an RC timing network and that different type pulse generators may be employed. In accordance with the invention, the output characteristics of such generators would be made variable in accordance with the particular characteristics of the type of shutter with which the control device is used. It is noted further that modifications other than those specifically enumerated may also be effected without departing from the scope and spirit of the invention. Thus the scope of the invention is to be determined not from the illustrative embodiments described hereinbefore but rather from the subjoined claims.

I claim:

1. An arrangement for controlling exposure in a photographic camera comprising: a shutter unit comprising shutter members mounted in the shutter unit and movable between open and closed positions to control the exposure time provided by the shutter unit, and electrical pulse operated means for moving said shutter members; a control unit separate from said shutter unit and including electronic control means comprising means for producing a first electrical pulse for controlling the opening movement of the shutter members and a second electrical pulse for controlling the closing movement of the shutter members, the time interval between said first and second pulses determining the effective exposure time provided by the shutter unit, and means for variably setting the time interval between the first and second pulses; and coupling means for detachably connecting said control unit to said shutter unit to permit the disconnection of a first said shutter unit from said control unit and the connection of said control unit to a further shutter unit having different operating characteristics from said first shutter unit, wherein the improvement comprises electrical compensating means included within each said shutter unit for cooperating with said electronic control means in said control unit to provide automatic compensation for the particular operating characteristics of a said shutter unit so that substantially the same effective exposure time is provided for a given setting by shutter units having different operating characteristics, said compensating means comprising at least one compensating element in each of said shutter units for compensating for the particular operating characteristics of the associated unit, and further coupling means for automatically connecting said compensating element to said electronic control means of said control unit when said control unit is connected to a said shutter unit.

2. An arrangement as claimed in claim 1 wherein the electronic control means comprises means for producing a control pulse, means for converting the leading edge of the control pulse into a first timing pulse and means for converting the trailing edge of the control pulse into a second timing pulse, said control pulse producing means including a variable RC network and said further coupling means comprising means for providing connection of compensating element into circuit relationship with said RC network to vary the time interval between the first and second pulses.

3. An arrangement as claimed in claim 2 wherein said compensating element comprises at least one resistance element.

4. An arrangement in accordance with claim 2 wherein each said shutter unit is located within a shutter housing and includes magnetic control means for controlling movement of the shutter members, said control unit being detachably connected to shutter housing through means including an electrical cable to permit remote operation of said shutter unit, said compensating element being mounted in said shutter housing and being connected into circuit relationship with said RC network upon connection of said control unit to a said shutter unit.